United States Patent
Adjakple et al.

(10) Patent No.: US 9,907,012 B2
(45) Date of Patent: Feb. 27, 2018

(54) INHIBITION OF ALLOWED CLOSED SUBSCRIBER GROUP LIST

(71) Applicant: INTERDIGITAL PATENT HOLDINGS, INC., Wilmington, DE (US)

(72) Inventors: Pascal M. Adjakple, Great Neck, NY (US); Mahmoud Watfa, Saint Leonard (CA); Virgil Comsa, Montreal (CA); Ulises Olvera-Hernandez, Kirkland (CA); J. Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 218 days.

(21) Appl. No.: 14/524,926

(22) Filed: Oct. 27, 2014

(65) Prior Publication Data

US 2015/0056956 A1 Feb. 26, 2015

Related U.S. Application Data

(62) Division of application No. 13/078,484, filed on Apr. 1, 2011, now Pat. No. 8,874,083.
(Continued)

(51) Int. Cl.
*H04W 48/04* (2009.01)
*H04M 1/725* (2006.01)
(Continued)

(52) U.S. Cl.
CPC ....... *H04W 48/04* (2013.01); *H04M 1/72577* (2013.01); *H04W 4/08* (2013.01);
(Continued)

(58) Field of Classification Search
CPC ....... H04W 12/08; H04W 4/02; H04W 12/06; H04W 4/021; H04W 12/02; H04W 28/18;
(Continued)

(56) References Cited

U.S. PATENT DOCUMENTS 8,219,101 B2 7/2012 Shin
8,666,410 B2 3/2014 Wu
(Continued)

FOREIGN PATENT DOCUMENTS

CN 101507309 A 8/2009
CN 101600157 A 12/2009
(Continued)

OTHER PUBLICATIONS

3rd Generation Partnership Project (3GPP), S3-090852, "Integrity protection of NAS messages that alter the allowed CSG list", Vodafone, 3GPP TSG-SA3 (Security), Meeting SA3#55, S3-090852, Shanghai, China, May 11-15, 2009, 3 pages.*
(Continued)

*Primary Examiner* — Liton Miah
(74) *Attorney, Agent, or Firm* — Condo Roccia Koptiw LLP

(57) ABSTRACT

Disclosed herein are techniques for inhibition of allowed closed subscriber group list. According to an aspect, a method may be implemented at a wireless transmit/receive unit (WTRU). The method may include identifying a public land mobile network (PLMN) in which the WTRU is operating. Further, the method may include controlling closed group subscriber (CSG) selection based on the identified PLMN. For example, on a per PLMN basis, the WTRU may display to the user all CSGs or only CSGs in an operator CSG list.

20 Claims, 9 Drawing Sheets

Related U.S. Application Data

(60) Provisional application No. 61/320,354, filed on Apr. 2, 2010, provisional application No. 61/373,478, filed on Aug. 13, 2010, provisional application No. 61/408,802, filed on Nov. 1, 2010.

(51) Int. Cl.
*H04W 4/08* (2009.01)
*H04W 48/02* (2009.01)
*H04W 48/20* (2009.01)
*H04W 84/04* (2009.01)
*H04W 88/02* (2009.01)

(52) U.S. Cl.
CPC ............ *H04W 48/02* (2013.01); *H04W 48/20* (2013.01); *H04W 84/042* (2013.01); *H04W 88/02* (2013.01)

(58) Field of Classification Search
CPC ..... H04W 36/00; H04W 48/02; H04W 48/04; H04W 4/023; H04W 48/08; H04W 36/0038; H04W 36/0061; H04W 48/00; H04W 60/00; H04L 63/0853; H04L 63/101
See application file for complete search history.

(56) References Cited

U.S. PATENT DOCUMENTS

| | | |
|---|---|---|
| 2008/0043726 A1 | 2/2008 | Herrero-Veron et al. |
| 2008/0267153 A1 | 10/2008 | Mukherjee et al. |
| 2009/0047968 A1 | 2/2009 | Gunnarsson et al. |
| 2009/0070694 A1* | 3/2009 | Ore .................... H04W 60/00 715/764 |
| 2009/0149178 A1 | 6/2009 | Bangma |
| 2009/0238117 A1 | 9/2009 | Somasundaram et al. |
| 2009/0305699 A1 | 9/2009 | Deshpande et al. |
| 2009/0270092 A1 | 10/2009 | Buckley et al. |
| 2010/0003965 A1 | 1/2010 | Kurz et al. |
| 2010/0029274 A1* | 2/2010 | Deshpande ......... H04J 11/0093 455/435.3 |
| 2010/0113020 A1* | 5/2010 | Subramanian ....... H04W 48/18 455/435.2 |
| 2010/0113026 A1* | 5/2010 | Narasimha ........... H04W 48/02 455/436 |
| 2010/0157944 A1 | 6/2010 | Horn |
| 2010/0161794 A1* | 6/2010 | Horn .................... H04W 48/02 709/224 |
| 2010/0203865 A1* | 8/2010 | Horn .................... H04W 48/16 455/411 |
| 2010/0291927 A1 | 11/2010 | Wu et al. |
| 2011/0177813 A1 | 7/2011 | Uemura et al. |

FOREIGN PATENT DOCUMENTS

| | | |
|---|---|---|
| EP | 2117261 A1 | 11/2009 |
| JP | 2009-165111 A | 7/2009 |
| JP | 2010-502063 A | 1/2010 |
| JP | 2010-541428 A | 12/2010 |
| JP | 2011-526449 A | 10/2011 |
| JP | 2012-513732 A | 6/2012 |
| TW | 201004412 A1 | 1/2010 |
| WO | WO 2009/043002 A2 | 4/2009 |
| WO | WO 2010/000351 A1 | 1/2010 |
| WO | WO 2010/016368 A1 | 2/2010 |

OTHER PUBLICATIONS

3rd Generation Partnership Project (3GPP), TS 22.220 V9.3.0, 3rd Generation Partnership Project (3GPP), Technical Specification Group Services and System Aspects; Service requirements for Home NodeBs and Home eNodesBs (Release 9), Dec. 2009, 22 pages.*
3rd Generation Partnership Project (3GPP), C1-082792, "Pseudo-CR on Option C for CSG Deployments", Telecom Italia, ZTE, 3GPP TSG CT WG1 Meeting #54, Zagreb, Croatia, Jun. 23-27, 2008, 12 pages.
3rd Generation Partnership Project (3GPP), C1-085376, "CSG Selection-NAS Aspects", Qualcomm Europe, 3GPP TSG CT WG1 Meeting #56, Shanghai, P.R. China, Nov. 10-14, 2008, 18 pages.
3rd Generation Partnership Project (3GPP), C1-093533, "Manual CSG Selection at a Different PLMN from the Last Registered PLMN", Qualcomm Europe, 3GPP TSG CT WG1 Meeting #60, Sevilla, Spain, Aug. 24, 2009, 5 pages.
3rd Generation Partnership Project (3GPP), R2-096665, "Correction Related to PLMN Selection in Manual CSG ID Selection Procedure", HTC Corporation, 3GPP TSG-RAN2 WG2 Meeting #68, Jeju, South Korea, Nov. 9-13, 2009, 5 pages.
3rd Generation Partnership Project (3GPP), TS 22.220 V10.1.0, "Technical Specification Group Services and Systems Aspects, Service Requirements for Home NodeBs & Home eNodeBs (Release 10)", Dec. 2009, pp. 1-23.
3rd Generation Partnership Project (3GPP), TS 24.008 V9.1.0, "Technical Specification Group Core Network and Terminals; Mobile Radio Interface Layer 3 Specification, Core Network Protocols, Stage 3 (Release 9)", Dec. 2009, pp. 1-595.
3rd Generation Partnership Project (3GPP), TS 29.272 V9.1.0, "Technical Specification Group Core Network and Terminals, Evolved Packet System (EPS), Mobility Management Entity (MME) and Serving GPRS Support Node (SGSN) Related Interfaces Based on Diameter Protocol (Release 9)", Dec. 2009, pp. 1-76.
3rd Generation Partnership Project(3GPP), C1-102890, "LS on Inhibiting the Allowed CSG List", TSG-CT WG1 Meeting #65, Dublin (Ireland), Jun. 28- Jul. 2, 2010, 2 pages.
3rd Generation Partnership Project(3GPP), C1-111049, "ACL Update When Manual CSG Selection Configuration Changes", TSG-CT WG1 Meeting #70, Salt Lake City, USA, Feb. 21-25, 2011, 2 pages.
3rd Generation Partnership Project(3GPP), C6-100107, "Introduction of Indicator for Inhibition of Allowed CSG List", Deutsche Telekom, TSG-CT6#54, San Francisco, USA, Feb. 23-26, 2010, 6 pages.
3rd Generation Partnership Project(3GPP), TR 23.830 V9.0.0, "Technical Specification Group Services and Systems Aspects, Architecture Aspects of Home NodeB and Home eNodeB", Sep. 2009, 8 pages.
3rd Generation Partnership Project(3GPP), TS 22.220 V9.4.0, "Technical Specification Group Services and Systems Aspects, Service Requirements for Home Node B (HNB) and Home eNode B (HeNB) (Release 9)", Mar. 2010, 10 pages.
3rd Generation Partnership Project(3GPP), TS 24.301 V9.1.0, "Technical Specification Group Core Network and Terminals, Non-Access-Stratum (NAS) Protocol for Evolved Packet System (EPS), Stage 3 (Release 9)", Dec. 2009, pp. 1-285.
3rd Generation Partnership Project, TS 22.220 V9.3.0, "Technical Specification Group Services and System Aspects, Service Requirements for Home NodeBs and Home eNodesBs (Release 9)", Dec. 2009, pp. 1-22.
European Telecommunications Standards Institute (ETSI), TS 124 285 V9.1.0, "Universal Mobile Telecommunications System (UMTS), LTE, Allowed Closed Subscriber Group (CSG) List, Management Object (MO), (3GPP TS 24.285 version 9.1.0, Release 9)", Jan. 2010, 16 pages.
3$^{rd}$ Generation Partnership Project (3GPP), TR 25.967 9.0.0, "3$^{rd}$ Generation Partnership Project; Technical Specification Group Radio Access Networks; Home Node B Radio Frequency (RF) Requirements (FDD) (Release 9)", May 2009, 55 pages.
3$^{rd}$ Generation Partnership Project (3GPP), C1-104425, "Support for displaying only CSGs in the Operator CSG List for manual

(56) References Cited

OTHER PUBLICATIONS selection", Qualcomm Incorporated, Motorola, 3GPP TSG-CT1, Meeting #67, Barcelona, Spain, Oct. 11-15, 2010, 2 pages.

* cited by examiner

INHIBITION OF ALLOWED CLOSED SUBSCRIBER GROUP LIST

CROSS REFERENCE TO RELATED APPLICATIONS

This application is a divisional of U.S. patent application Ser. No. 13/078,484, filed Apr. 1, 2011, which claims priority to U.S. Provisional Patent Application No. 61/320,354, filed Apr. 2, 2010, U.S. Provisional Patent Application No. 61/373,478, filed Aug. 13, 2010, and U.S. Provisional Patent Application No. 61/408,802, filed Nov. 1, 2010, the contents of all of which are incorporated by reference as if fully set-forth herein in their respective entirety, for all purposes.

BACKGROUND

The current effort for the 3GPP Long Term Evolution (LTE) program is to bring new technology, new architecture, and new techniques in the new LTE setting and configurations to provide improved spectral efficiency, reduced latency, and better utilization of the radio resources to bring faster user experiences and richer applications and services with less cost.

As part of these efforts, the 3GPP has introduced the concept of a home node B or home enhanced Node B (HeNB) in LTE (and also, possibly in other cellular standards). The HeNB refers to a physical device similar to a wireless local area network (WLAN) access point (AP). The HeNB provides users with access to LTE services over extremely small service areas, such as homes or small offices. The HeNB is intended to connect to the operators' core network by using, for example, public Internet connections. This can be particularly useful in areas where LTE has not been deployed and/or legacy 3GPP radio access technology (RAT) coverage already exists. This may also be useful in areas where LTE coverage may be faint or non-existent for radio transmission problems that occur, for example, while in an underground metro or a shopping mall.

A cell refers to the area over which radio coverage provided by the HeNB is available. The cell deployed by the HeNB may be accessed only by a group of subscribers who have access to the services of the cell (e.g., a family) and such a cell may be referred to as a HeNB cell, or more commonly, a Closed Subscriber Group (CSG) cell. A HeNB may be used to deploy one or more CSG cells over the area which LTE coverage is desired. The term CSG call may be used for a cell deployed by a HeNB for LTE services or by a HNB for WCDMA or other legacy 3GPP RAT services.

In some cases, for example, a malicious user or group of users may attack the network by overloading the network with unnecessary signaling. As a result, the network can become overburdened, and the quality of service provided by the network may be significantly reduced. Furthermore, some wireless network operators want to limit their subscribers from accessing CSG Cells while roaming on a visited network to prevent differentiated service aspects and possible fraud. For at least these reasons, it is desired to provide techniques for preventing or deterring such acts.

SUMMARY

Disclosed herein are systems and methods for inhibition of allowed closed subscriber group list. According to an aspect, a method may be implemented at a wireless transmit/receive unit (WTRU). The method may include identifying a public land mobile network (PLMN) in which the WTRU is operating. Further, the method may include controlling closed group subscriber (CSG) selection based on the identified PLMN. For example, on a per PLMN basis, the WTRU may display to the user all CSGs or only CSGs in an operator CSG list.

According to another aspect, a method may be implemented at a WTRU. The method may include requesting access to a closed subscriber group (CSG) cell by use of a CSG identifier. Further, the method may include receiving a message indicating denial of access to the CSG cell and that enables the WTRU to prevent user selection of the CSG identifier for inhibiting an allowed CSG list.

According to another aspect, a method implemented at a WTRU may include receiving, from one of an Open Mobile Alliance Device Management (OMA DM) and a subscriber identity module over-the-air (SIM OTA) communications connection, a message that enables the WTRU to control inhibition of an ACL. The method may also include controlling inhibition of the ACL in response to receiving the message.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Disclosed herein are systems and methods for inhibition of allowed closed subscriber group list. According to an aspect, a method may be implemented at a wireless transmit/receive unit (WTRU). The method may include identifying a public land mobile network (PLMN) in which the WTRU is operating. Further, the method may include controlling closed group subscriber (CSG) selection based on the identified PLMN. For example, on a per PLMN basis, the WTRU may display to the user all CSGs or only CSGs in an operator CSG list. This aspect and various other aspects of the presently disclosed subject matter are described in further detail herein.

When referred to hereafter, the term "wireless transmit/receive unit" or "WTRU" includes, but is not limited to, user equipment (UE), a mobile station, a fixed or mobile subscriber unit, a pager, a mobile telephone or cellular telephone, a personal digital assistant (PDA), a computer, or any other type of user device configured to operate in a wireless environment. When referred to hereafter, the term "base station" includes, but is not limited to, a Node B, a site controller, an access point (AP), or any other type of interfacing device configured to operate in a wireless environment.

Figure 1:
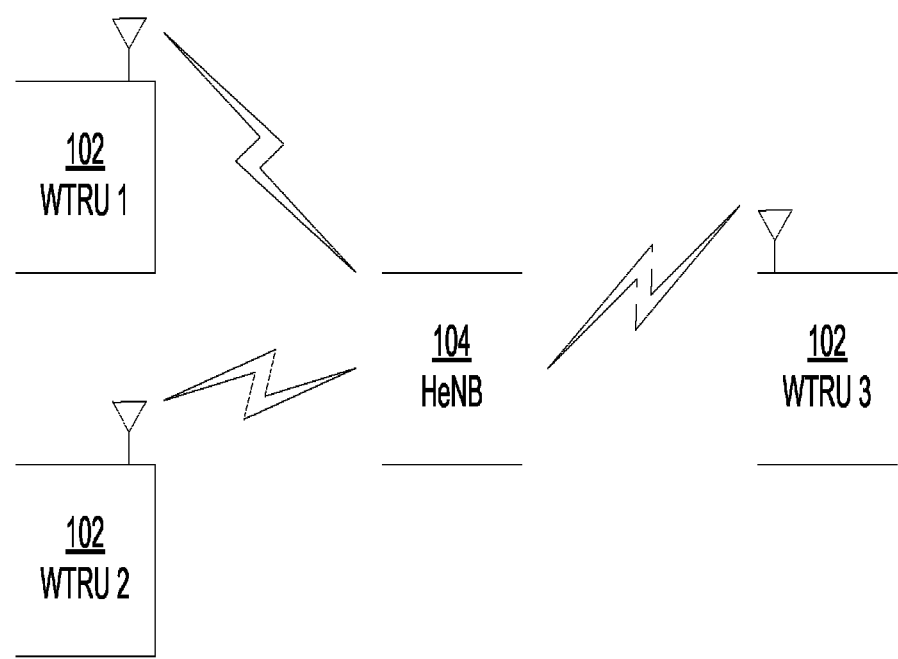
FIG. 1 illustrates a block diagram of an example wireless communication system including multiple WTRUs and an HeNB according to embodiments of the present disclosure.

FIG. 1 illustrates a block diagram of an example wireless communication system 100 including multiple WTRUs 1, 2, and 3 102 and an HeNB 104. Referring to FIG. 1, the WTRUs 1, 2, and 3 102 are in communication with the HeNB 104. It is noted that, although an example configuration of WTRUs 102 is depicted in FIG. 1, any combination of wireless and wired devices may be included in the wireless communication system 100.

Figure 2:
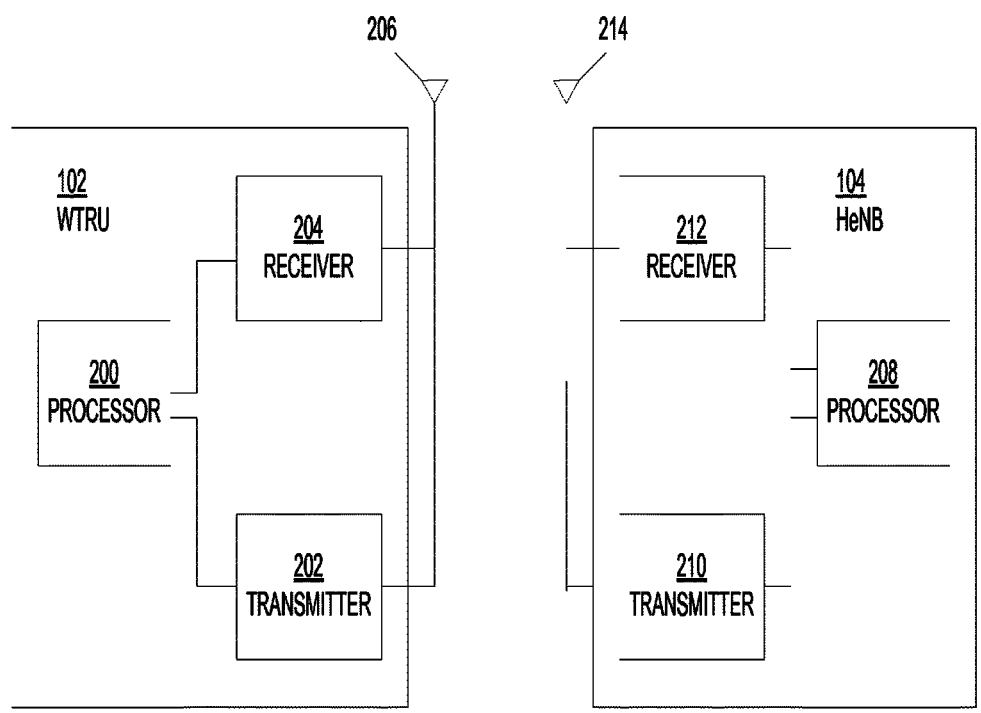
FIG. 2 illustrates a block diagram of an example WRTU and HeNB of the wireless communication system shown in FIG. 1 according to embodiments of the present disclosure.

FIG. 2 illustrates a block diagram of an example WRTU 102 and HeNB 104 of the wireless communication system 100 of FIG. 1. As shown in FIG. 1, the WTRU 102 is in communication with the HeNB 104. Referring to FIG. 2, the WTRU 102 includes a processor 200, a transmitter 202, a receiver 204, and an antenna 206. The transmitter 202 and the receiver 204 are in communication with the processor 200. The antenna 206 is in communication with both the transmitter 202 and the receiver 204 to facilitate the transmission and reception of wireless data. The processor 200 of the WTRU 102 is configured to perform cell selection.

The HeNB 104 includes a processor 208, a transmitter 210, a receiver 212, and an antenna 214. The transmitter 210 and the receiver 212 are in communication with the processor 208. The antenna 214 is in communication with both the transmitter 210 and the receiver 212 to facilitate the transmission and reception of wireless data. The processor 208 of the HeNB 104 is configured to provide information to the WTRU 102 usable for cell selection.

The HeNB 104 may provide wireless service access on a subscription basis to a Closed Subscriber Group (CSG) that may include one or more WTRUs. The HeNB 104 may broadcast a CSG indicator set to true and a CSG identity to provide services only to its associated CSG users. For example, the CSG indicator and the CSG identity may be communicated to WTRUs 1, 2, and 3 102. In addition, the HeNB 104 may also operate in a hybrid mode where access is granted to WTRUs that belong both to CSG users and non-CSG users. In the hybrid mode, the HeNB 104 may broadcast a CSG indicator set to false and a CSG identity.

For CSG cell access, a WTRU can maintain two lists that contain the CSG identities of the CSG cells (e.g., HeNB 104) that the WTRU is permitted to access. These lists are referred to as an operator controlled list (OCL) and an allowed CSG list (ACL). The OCL is read-only and may only be modified by the operator while the ACL may be modified by the WTRU. For example, the WTRU may modify the ACL based on outcomes of non-access-stratum (NAS) procedures. Another example way to modify both the OCL and the ACL is to use Open Mobile Alliance Device Management (OMA DM) procedures to modify the lists in the WTRU and subscriber identity module over-the-air (SIM OTA) procedures to modify the lists in the universal subscriber identity module (USIM).

In a wireless communications system, such as the system 100 shown in FIG. 1, if available, one or more CSGs may be displayed to a user of a WTRU 102. For example, as part of manual CSG selection, one or more CSGs may be displayed to the user. As an example, the following order of display is followed: (1) the CSGs, whose CSG identities are contained in the Allowed CSG list; (2) the CSGs, whose CSG identities are contained in the operator CSG list; and (3) any other CSG, whose CSG identity is not included in the allowed CSG list or the operator CSG list.

In response to user selection of a CSG, the WTRU 102 may attempt to register with the network associated with that CSG if the CSG ID is not in either the OCL or the ACL. For example, the WTRU 102 may send to the HeNB 104 a tracking area update (TAU)/routing area update (RAU)/location area update (LAU) request to inform the network that the user has selected a CSG cell that does not have a CSG ID in either the OCL or the ACL. Depending on the network's response, the WTRU 102 may be granted access to the CSG cell, thus allowing the user to select a CSG cell manually. For example, the WTRU 102 may receive a TAU accept message that allows the WTRU 102 to access the HeNB 104. However, in some situations it may be desirable to inhibit use of the ACL and/or change how the WTRU responds to manual CSG display and selection.

Using system and method embodiments disclosed herein, an operator may disable an ACL, display a customized HeNB name for a specified group of users, ensure the names of CSGs in OCL take precedence over the names in ACL, and allow temporary membership CSGs to be managed through ACL while permanent membership to be managed through OCL as well as various other functions as will be understood. Further, system and method embodiments may be used for preventing a malicious user or group of users from attacking a network by overloading the network with unnecessary signaling.

Further, inhibition of CSG list may be applied, but not limited to, conditions including: (1) WTRU being located in the home PLMN where the ACL is inhibited and manual selection is allowed; (2) the WTRU is located in the home PLMN where the ACL is inhibited and manual selection is inhibited or not allowed; (3) the WTRU is located in the home PLMN where the ACL is allowed and manual selection is inhibited; (4) the WTRU is located in the visited PLMN where the ACL is inhibited and manual selection is allowed; (5) the WTRU is located in the visited PLMN where the ACL is inhibited and manual selection is inhibited; and (6) the WTRU is located in the visited PLMN where the ACL is allowed (not inhibited) and manual selection is inhibited or not allowed.

In accordance with embodiments of the present disclosure, ACL inhibition may occur on a specific radio access technology (RAT) or on a per public land mobile network (PLMN) basis. For example, the embodiments disclosed herein, may apply to the LTE, the 3G system, and/or any other system having CSG-like functionality. Additionally, the ACL inhibition may occur on a per-WTRU/per-user basis or on a profile basis. For example, ACL inhibition may be performed for all WTRUs or users having subscriptions or profiles that match a given subscription or profile.

In an embodiment of the present disclosure, the inhibition of an ACL may be associated with a timer. For example, a timer may be set such that an individual CSG ID, a group of CSG IDs, or the ACL as a whole may be invalidated for a set time. The timer may be preconfigured with a known value, or range such that the inhibition/invalidation lasts for a preconfigured/signaled duration of time from the moment the inhibition/invalidation started. The inhibition/invalidation may be signaled or preconfigured to apply at certain times. For example, the ACL may be inhibited between 6:00 pm and 8:00 pm. In the case of inhibition of individual CSG or inhibition of subsets of CSGs, there may be multiple instances of the inhibition timer where each instance may be set with different timer configuration values.

In another embodiment of the present disclosure, use of an ACL may be inhibited when the CSG IDs in the ACL exceed a given number. For example, a WTRU may be prevented from adding to an ACL when a given number entries, that may either be preconfigured or signaled to the UE, already exist in the ACL. This may be used in conjunction with a flag in the WTRU, which, if set, may signal that that no additional CSG IDs may be added. The setting of the flag may also be interpreted as a limitation to the number of CSG ID additions that may be made to the ACL. If the maximum number of entries is reached, new entries may be added if a CSG ID is removed from the ACL. A "best cell principle" technique may be applied for initial cell selection or intra-frequency cell re-selection. For example, the UE may (re)select the suitable cell which may be the highest ranked cell.

In another embodiment of the present disclosure, manual cell selection may be used as an interference avoidance mechanism to help users that are victims of interference to manually select a likely better cell as a serving cell. For example Cell1 and Cell2 are co-channel cells and belong to the same CSG (i.e., CSG1). Moreover, Cell2 also belongs to CSG2 but Cell1 doesn't. The cell selection or intra-frequency cell re-selection procedure may not allow the WTRU to select or re-select to, for example, a Cell 2 if a Cell 1 is the highest ranked cell. In the situation where the WTRU may be experiencing uplink (UL) interference in Cell 1 from a macro-WTRU, the HNB-WTRU may be stuck to Cell 1 and may not be able to select or re-select to Cell 2 which will be a better serving cell for the HNB-WTRU. Moreover, in the case of initial access, the WTRU may not be able to access the system through Cell 1 while Cell 2 would have been a good candidate. Manual CSG selection would allow the user to select CSG2 leading to the selection of Cell 2.

In another embodiment of the present disclosure, Cell 1 and Cell 2 may belong to CSG 1 and CSG 2, respectively. Both cells may operate on different frequencies. In the context of CSG-to-CSG idle mode mobility, while camped on a suitable CSG cell, the WTRU may consider the frequency of the serving cell to be the highest priority frequency (i.e., higher than the eight network configured values or highest HCS priority) as long as the serving cell may be considered the highest ranked cell on that frequency. Moreover, for the purpose of cell selection or cell re-selection, there may not be relative priority defined between CSG cells. Assuming both Cell 1 and Cell 2 may be suitable cells for the WTRU to select or re-select and camp on to receive normal services, the WTRU may always select the Cell 1 assuming Cell 1 is the highest ranked (strongest) cell. The WTRU may not be able to automatically select or re-select Cell 1 to avoid UL interference from macro WTRU. In the case of initial access, the WTRU may not be able to access the system through Cell 1 while Cell 2 would have been a good candidate.

In another embodiment of the present disclosure, manual cell selection may be used for load balancing or load distribution between cells. For example, if Cell 1 and Cell 2 are suitable cells, Cell 1 and Cell 2 may be selected so as to distribute the load between the cells even though this may be against the current cell selection or cell re-selection rules.

In an embodiment, the network may configure a WTRU to display CSGs (as part of manual CSG selection) such that the display is either: (1) not restricted by the ACL and the OCL (i.e. any detected CSG will be displayed); or (2) restricted to entries in the OCL only (i.e., any detected CSG that is not in both lists will not be displayed, and moreover, any detected CSG that is part of the ACL will also not be displayed except if the same entry exists in the OCL).

It may be assumed that the reason why an operator would configure a WTRU to display only entries in the OCL (if detected) is so that full control can be taken regarding what CSGs the WTRU can access. This may be achieved because no other ID can be added to the ACL via manual selection since the WTRU only displays detected CSGs that are in the OCL. However, some CSG cell can operate in hybrid mode, i.e., they allow access by members and non-members, with the former having priority over resources. In addition, the current behavior is such that if a WTRU selects a CSG that operates in hybrid mode, the WTRU does not add the CSG ID to the ACL even if the registration (TAU/RAU/LAU) succeeds. Thus, given that a CSG ID of a hybrid cell can never be added to the ACL, it is seen harmless that a WTRU displays detected hybrid mode CSGs even if the WTRU is configured to display only CSGs that are in the OCL. Thus, there may be a drawback with the display when some cells operate in hybrid mode as these cells might be the best cells in terms of signal strength and not displaying them can have impacts on the UE services.

Treatment of CSG List—UE is Located in the Home PLMN or VPLMN

In accordance with embodiments of the present disclosure, control of CSG selection may be implemented on a per PLMN basis. For example, WTRU may identify a PLMN in which the WTRU is operating. Further, the WTRU may control a CSG selection or presentation based on the identified PLMN. For example, on a per PLMN basis, the WTRU may display to the user all CSGs or only CSGs in an operator CSG list. Control of CSG selection may be implemented based on, for example, whether the WTRU is within a home PLMN or a visited PLMN.

In an example embodiment of the present disclosure, an ACL may be inhibited and manual CSG selection may be inhibited or not allowed when the WTRU is located in the home PLMN (HPLMN) or VPLMN. The control of ACL or OCL and whether or not the displayed CSG is only from OCL or from both ACL and OCL may be on per PLMN basis. Under this condition, the WTRU may rely on the operator's CSG list (OCL) for selection of CSG cells and the WTRU may or may not display CSGs. For example, with regard to displaying CSGs, the WTRU may display all available CSGs, both CSG contained in the OCL and available CSGs and the WTRU tags those CSGs that may be part of the OCL list. In another example, the WTRU may display only available CSGs that may be contained in the OCL list. In another example allowing partial user selection, the WTRU may allow the user to select CSGs as long as they may be part of the OCL. In another example allowing partial user selection, the WTRU may allow the user to trigger a new CSGs selection in such a way that a new CSG other than the current one may be selected; however, the user may not be allowed to choose which CSG should be selected. In this example, this may occur when the user experiences poor quality on the current cell and the user wishes to try cells in other CSGs.

In another embodiment, the ACL may be allowed and Manual CSG selection may be inhibited or not allowed when the WTRU is located in the HPLM. Under this condition, the UE may use both the ACL and the OCL for selection of CSG cells. However, adding CSG entries into the ACL list may be done through operator specific methods such as OMA or OTA. In this case, the WTRU may display available CSGs contained in both ACL and OCL. Additionally, the WTRU may display available CSGs that may not be contained on either the ACL or the OCL. In another example of partial user selection, the user may be given the choice to decide whether CSGs from the ACL or the OCL may be used for CSG selection, however the user may not be allowed to select specific target CSG cells. In another example of partial user selection, the user may be given the choice to select specific CSGs from either the ACL or OCL but only as long as the UE may be located in the HPLM. Alternatively, the user may be allowed to select CSGs from the OCL. Furthermore, the user may be allowed the choice to select specific CSG from either list as determined by the operator, but not all CSGs. These CSGs may or may not be tagged with a specific identifier. Further, the user may see the usual displayed list, however, upon selection, the UE may not send registration messages (tracking/routing/location area update messages). This may be used in combination with any of the embodiments disclosed herein.

In another example embodiment, the ACL may be inhibited and manual CSG selection may be allowed. Under this condition, the WTRU may not use CSG entries that may be part of the ACL. Further, manual selection of available CSG does may not lead to a CSGs being inserted in any list. Manual selection of a CSG that may not be in the OCL, while the WTRU is on a VHLPM, may trigger a TAU, even if such CSG has the same TA as the current CSG.

Temporary Allowance of a WTRU on a "Transition" Type CSG as a Means to Help Control Interference In accordance with embodiments of the present disclosure, an ACL may contain special CSG entries that may be called "transition" CSG cells or any other name. These cells (or the network) may allow temporary access for a WTRU while the WTRU may be handed over or redirected to a suitable CSG cell or macro cell. The behavior of both the WTRU and the CSG cell is further described herein.

For autonomous reselection, a WTRU may select CSGs within the OCL, or CSGs within the ACL that are not tagged as "transition" CSGs. After following the standard cell selection process, a WTRU may be camped on an allowed cell. However, once becoming connected, the WTRU may experience a high amount of interference, which may be detrimental to successful operation. This interference may be determined by the WTRU based on observed interference levels, or by the user based on personal experience such as monitored service quality. Given that the interference comes from a cell in a CSG that may be tagged as "transition" CSG in the ACL (or OCL), the WTRU may be allowed to either be handed over to the interfering cell in that CSG (if the WTRU is in connected mode) or reselect to that cell (if the WTRU is in idle mode). The reselection may be performed autonomously by the WTRU or it may require manual selection. Where manual selection may be required, the display of the white list to the user may include labels to indicate to the user which CSGs may be selected in case of poor channel conditions on other CSG cells.

When the WTRU selects one such CSG, the WTRU may be aware that it may be granted temporary access. Temporary access may allow the WTRU to stay connected in that cell and to receive full services for a limited period of time. At the end of this access, the WTRU may be handed over to a cell in a CSG to which it may have membership (or to a non-CSG cell). In such a case, the WTRU may keep the CSG in the ACL (or OCL) and keep the "transition" CSG label. The WTRU may also have the ability to transmit the required measurements to trigger interference cancellation. The measurement report may also indicate the cell to which it was originally connected to and where it intends to return. This may be useful in some flavors of interference cancellation. Upon reception of the measurement report including interference information, the CSG cell may then proceed with a handover to the original cell, or to any other open cell, or CSG cell for which the UE has membership. In such a case, the WTRU may keep the CSG in the ACL (or OCL) and may keep the "transition" CSG label. Further, the CSG cell may perform access control and determine that the WTRU has full membership to the CSG. In such a case, the WTRU may be allowed to remain connected and may receive full membership. The cell may then inform the WTRU that it may remove the "transition" label from that CSG list(s). In this case, the CSG ID may then be included in the ACL (or OCL) as a regular CSG.

Upon determining that the WTRU on the currently selected cell has high interference, a user may manually select a CSG that may not be in either ACL or OCL. In such a case, given that the WTRU may not have membership in that CSG cell, the WTRU may nevertheless be granted "transition" type access by the CSG. The CSG cell (or the network) may then either signal to the WTRU that it may not add the CSG ID to its ACL. Alternatively, the CSG cell (or network) may signal to the WTRU to add the CSG ID to its ACL and add the "transition" CSG label.

The ability to use the cell as a transition cell may also be broadcasted in the SIBs or in an initial message (i.e. RRC procedure) or NAS messages. As such, the WTRU may add the CSG ID to the ACL (or OCL) with the "transition" label without a need to have previously been connected to that CSG. This may be used to cut down on measurement reporting time, since a WTRU may not attempt a full connection but instead may just transmit measurement reports including interference information.

Additional Update to Manual CSG Selection Regardless of the ACL Status (Inhibited or Not)

In embodiments of manual CSG selection, an indication may be given (display or vocal indication) to help a user select a CSG or re-select from a given CSG to a better CSG. The indication may be with respect to quality metrics such as interference (UL, DL, both UL and DL), load (e.g., number of WTRUs being served by the cell that will be selected once the WTRU selects a given CSG) or both, or service quality. Further, an indication (display or vocal) may be provided to steer away a user from a given CSG, for example, as a function of the user's past experience on that CSG. In another example, an indication (display or vocal) may be provided to lure/attract a user to a given CSG for example in function of his past experience on that CSG. In another example, the CSG manual search may not display CSGs or should gray out CSGs in which the user has recently been exposed to bad user experience. A bad user experience may be defined, for example, as high interference, uneven load between cells leading to bad user experience, QOS below guaranty QOS, call drop, or the like.

Further, any combination of these examples may be provided in accordance with embodiments of the present disclosure.

Manual CSG Selection in CELL_FACH

While in Cell_FACH, an indication (display or vocal) may be provided to the user that manual CSG selection may be allowed in CELL_FACH. For example, the user may have the option to trigger a cell update procedure through CSG manual selection. Alternatively, for example, the user may be provided with a display of CSG cells as per usual manual CSG selection process even if the DE may be in Cell_FACR. The WTRU may also be provided with an indication from the network that manual CSG selection may be allowed in CELL_FACR. This may be provided in system information messages, or any RRC/NAS message.

Manual CSG Selection as a Mechanism for Membership Expiry Avoidance

In accordance with embodiments of the present disclosure, when a WTRU is camped on a cell or being served on a cell which belongs to a CSG where the WTRU membership may be about to expire, an indication (display or vocal) may be provided to the user with a list of CSGs where the WTRUs may still have valid membership. The user may then have the option to trigger a manual CSG selection to a different CSG by selecting a CSG from the list of CSGs presented to him. As part of the result (display or vocal) of the manual CSG selection, an indication may be provided to the user about a likelihood or remaining time allowance of a CSG membership having expired or not.

Other Embodiments in Accordance with the Present Disclosure

The embodiments described in this section may be used in combination together or with any other embodiments described herein.

In an embodiment of the present disclosure, a WTRU may be informed whether or not manual CSG selection may be allowed, optionally in conjunction with other functionalities, e.g., inhibition or allowance of the use of the ACL. This indication may be provided in system information, RRC, or NAS messages. The signaled information may by default apply to a visited PLMN, or the WTRU may be informed if manual CSG selection may be allowed per mobility into a new PLMN, service (tracking, routing, and location) area, MME, SGSN, etc. The indication may also be provided via OMA DM or OTA. The higher layers may be provided with such indication and further actions may be taken. For example, the user may be informed about the fact that manual CSG selection may or may not be allowed.

In another embodiment of the present disclosure, the OCL may have higher priority than the ACL. For example, all entries in the OCL may have higher priority than those in the ACL. This may be configured in the WTRU by default or may be signaled via RRC/NAS or OMA DM or OTA messages. Alternative priority levels may also be signaled or configured as per network/operator policy. Thus, the WTRU may choose between CSGs when this may be the case. Such cell selection scheme may overwrite the regular rules. Such priority may also be displayed to the user when performing manual CSG selection.

In another embodiment of the present disclosure, in LTE for example, if the ACL may be inhibited and the WTRU receives a NAS message from a CSG cell and the security check fails, the WTRU may choose to take the message into account despite the failure in security check.

WTRU Behavior for Automatic Cell (Re)Selection with a WTRU is Configured to Only Display CSGs that are Detected and in the OCL Disclosed in this section are various embodiments that may be implemented if a WTRU is configured to limit the CSGs displayed, as part of manual CSG selection, to detected CSGs that are part of the OCL list only.

In an embodiment, a WTRU may consider the ACL entries as valid entries for automatic cell reselection. In this case, it is proposed that even if the WTRU is configured to only display detected CSGs that are part of the OCL, the WTRU can still use the entries in the ACL for automatic cell reselection e.g. idle mode mobility or Cell_FACH mobility into a CSG cell. Further, it is possible though that when the WTRU receives the configuration, to only display entries in the OCL if detected, the cell on which the WTRU is camped might be a CSG cell with an ID that is part of the ACL entries only. In this case, it is proposed that the WTRU can remain on the current CSG cell even if the identity is in the ACL. Optionally, the WTRU can also continue to display such CSG as the CSG to which the cell that the WTRU is currently camping on belongs to independently of the display of CSGs in support of the manual CSG selection. It is noted that the above proposals and the following proposals apply to idle mode reselection, Cell_FACH mobility, and connected mode handover.

In another embodiment, a WTRU may not consider the ACL entries for automatic cell reselection. In this case, the WTRU may not consider (i.e., ignores) entries of the ACL for autonomous reselection (or selection, or Cell_FACH mobility, or optionally connected mode handover unless if commanded by the network) into CSG cells. Thus, the WTRU only considers the OCL entries for the related mobility type. It is possible though that when the WTRU receives the configuration, to only display entries in the OCL if detected, the cell on which the WTRU is camped might be a CSG cell with an ID that is part of the ACL entries only. In this case, it is proposed that the WTRU directly reselects to another cell when the configuration is received. Alternatively, the WTRU is expected to reselect to another cell within a default or configured time value. Also, the WTRU can perform a reselection to another cell when it goes to idle mode. Optionally, the WTRU can remain on the current CSG cell (when the configuration is received to only display detected CSGs in the OCL) even if its ID is in the ACL. However, the WTRU is temporarily allowed on the current cell until the next reselection occurs, after which the WTRU doesn't consider the CSG as valid even if it was temporarily allowed there. Meanwhile, however, the other entries in the ACL are not considered for autonomous cell reselection. Additionally, if a WTRU remains on the CSG cell for some time, it is proposed that the WTRU changes what is displayed to the user if the display indicates the actual CSG ID or H(e)NB name that is associated to the CSG on which the WTRU is currently camped (and which is part of the ACL). In this way, the user thinks that the WTRU has actually reselection to another cell and thus if the user tries to perform manual CSG selection, the user will not see the CSG ID as part of the detected list. In another alternative, the display of CSGs for the purpose of manual CSG selection is handled independently from the display of the CSG to which the cell that the WTRU is currently camped on belongs to. In that case, the CSG that the WTRU camps on is always display as the currently used CSG while in parallel, the CSG display for the purpose of manual CSG selection may or may not display the CSG that the WTRU is currently camping on.

Further, the WTRU may comply with any HO that moves the WTRU into a CSG that is not part of the OCL (i.e., CSG can be part of ACL or not) even if the WTRU is configured to display only entries in the OCL for manual selection. In this case, the WTRU might modify the display such that the user doesn't know that the current CSG on which the WTRU is on is actually not part of the OCL. The display might be void, e.g., nothing is displayed and the user thinks the WTRU is on a macro cell. Optionally, the WTRU may also continue to display such CSG as the CSG to which the new serving belongs to independently of the display of CSGs in support of the manual CSG selection.

Alternatively, the WTRU may be informed if the entries of the ACL are to considered for automatic cell reselection or other forms of mobility. Also, a default behavior can be assumed if such indication about how to consider ACL entries is not sent to the WTRU.

For both embodiments, if the WTRU is not allowed to remain on a CSG cell (whose ID is part of the ACL only) when a configuration is received to only display detected CSGs in the OCL, various actions can be implemented by the WTRU and/or the network. For example, the WTRU may send proximity indication to the network for the purpose of triggering connected mode HO to other CSG cells that are part of the OCL, or to macro cells. The proximity indication can indicate the WTRU's proximity to other CSG cells, or the indication can suggest that the WTRU is leaving the proximity of a CSG cell even though that might not be the case. This example can trigger the network to perform connected mode HO to a macro cell or other CSG cells. In another example, the core network (i.e., MME or SGSN or MSC or HNB GW if applicable) indicate to the CSG/HNB GW (which in turn indicates to the CSG) that certain WTRUs are not supposed to remain on that CSG if the identity is in the WTRU's ACL only, and the WTRU has received an indication to only display OCL entries. Thus, the recipient node can then perform a handover to move the WTRU to other cells on which they are allowed and for which there is on restriction.

If a WTRU receives a configuration to only display detected CSGs that are part of the OCL only, the WTRU can display hybrid CSG cells even if they are not part of the OCL. This is because a manual selection of a hybrid cell that triggers a registration to the network (WTRU sends registration of the ID of the selected cell is not in any of the WTRU's lists) will not cause the addition of the associated ID to the ACL. Thus, there is no harm in displaying detected hybrid cells that are not part of the OCL.

It is noted that the embodiments disclosed herein can be used in any combination and for any system, e.g., 3G, LTE, etc. whenever applicable. Moreover, embodiments disclosed herein may be applied to HPMN and/or VPLMN.

Figure 3:
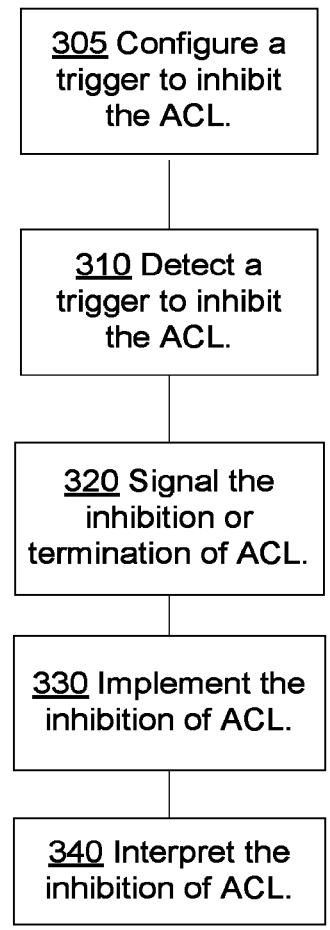
FIG. 3 illustrates a flow chart of an example method to inhibit use of an ACL according to embodiments of the present disclosure.

FIG. 3 illustrates a flow chart of an example method to inhibit use of an ACL according to embodiments of the present disclosure. The example method may be applied per list of PLMN. For example, the WTRU may not carry an inhibition when a PLMN change occurs as the WTRU may be informed as to whether or not the ACL shall be inhibited when a PLMN change occurs. Additionally, the WTRU may be informed if the inhibition may be applicable when a PLMN change occurs. Note that PLMN change may be for roaming cases such as visited PLMNs, or for equivalent PLMNs. Additionally, the example method may also be applied on a per list of RAT basis, or on a per RAT basis with a combination of a PLMN.

In an example embodiment, the scope of inhibition may be per list of tracking area (TA), routing area (RA), and location area (LA), per serving node, or the like. The inhibition may also be associated with a geographic area, a region, a country, or the like. The scope of the inhibition may be applicable until the inhibition is terminated or may be guarded by a timer, the expiry of which may lead to termination of the inhibition of the ACL. For example, the ACL inhibition may forcibly be terminated while the time is still running. It should be noted that the length of the timer may be pre-configured or may be signaled to a WTRU via dedicated messaging, broadcast system message, broadcast information message, or the like. For example, a broadcast message may inform the WTRU about both the moment the inhibition should start and its duration. Moreover, the WTRU may be informed about the places, time, and/or network in which the inhibition may not apply. As such, the WTRU may start or terminate the inhibition based on its location and the information with which it was provided about the inhibition. The WTRU may also assume that the same scope may apply in its home PLMN and any equivalent PLMNs, or the WTRU may be informed if it needs to apply the same inhibition or termination of inhibition in the equivalent PLMNs.

Referring to FIG. 3, at 305, a trigger to inhibit the ACL is configured, and, at 310, the trigger to inhibit the ACL is detected. The trigger may be an event that may signal that the ACL may be inhibited. For example, the ACL may be inhibited after the current signaling or traffic load on the network exceeds a certain threshold.

A number of consecutive failures in CSG access may trigger the need for the ACL to be inhibited when the consecutive failures exceed a specific threshold. The WTRU may be pre-configured with the threshold value or the threshold value may be signaled to the WTRU. When the WTRU detects that the threshold value may be exceeded, the WTRU may take action to inhibit the ACL without signaling from the network to do so. Depending on the scope of inhibition, the WTRU may later terminate the inhibition. For example, if the scope has been set according to a timer, the WTRU may autonomously terminate the inhibition. The WTRU may also signal its inhibition or inhibition termination of the ACL to the network, as will be further described below.

Entry to a PLMN, a TA, a RA, a LA, a MME, a SGSN, a MSC, or the like may also lead to the inhibition of the ACL autonomously by the WTRU until explicit indications are received from the network. The WTRU may be informed about the PLMN, a TA, a RA, a LA, a MME, a SGSN, a MSC, or the like for which it may inhibit the ACL. This WTRU may be informed without signaling with the network. In addition, specific CSG ID may be associated with such information such that the WTRU may access there CSG cells within a PLMN, a TA, a RA, a LA, a MME, a SGSN, a MSC, or the like.

The expiration of a CSG membership or the expiration of the last CSG in which the UE was a member may trigger the inhibition of the ACL. Additionally, the, membership expiration may be realized with ACL inhibition. Additionally, the membership expiration may be realized with ACL inhibition.

The number of CSG IDs in the ACL may also trigger the inhibition of the ACL. For example, after the number of CSG IDs in the ACL exceeds a threshold, the inhibition of the ACL may be triggered. The threshold may be preconfigured or signaled to the WTRU. It should be noted that in this scenario, the WTRU may be permitted to modify the ACL by deleting or reducing the number of the CSG entries in the ACL. The modification may be performed without explicit indication from the network.

Inhibition of the ACL may also be triggered by the number of CSG entries in the OCL. For example, if the OCL was empty, the addition of a CSG ID to the OCL in the WTRU may acts as a trigger to inhibit the ACL.

All of the triggers described above may occur individually, or in a combination. Additionally, all of the triggers described above may apply to WTRU-based inhibition and/ or user profile-based inhibition.

At 320 of FIG. 3, signaling the inhibition of the ACL, or the termination of inhibition may occur. In an example, the WTRU may receive a signal indicating inhibition or termination of inhibition of the ACL. Signaling to the WTRU may occur via OMA DM, OTA, broadcast of system information, broadcast of system messages, dedicated RRC, dedicated NAS messages, or the like. For example, the WTRU may receive an attach, TAU, RAU, or LAU Accept response that may indicate that inhibition of the ACL may be required. Signaling to the WTRU may be also achieved by the use of a new information element (IE) or bitmap that may be included in a RRC/NAS messages. The inhibition may also be signaled by using a new cause code in NAS messages. For example, a NAS service request message may be rejected if sent from a CSG cell with a new cause code that may indicate that the ACL is inhibited.

Additionally, the WTRU may perform a security check on the NAS/RRC message that signals the ACL inhibition. When the WTRU determines that the message does not pass the security check, for example of the message has no security protection or fails authentication, the WTRU may ignore the ACL inhibition signal within the message, and/or the message itself.

The WTRU may save the inhibition status on a per PLMN basis. For example, the WTRU may terminate the inhibition when it enters a visited PLMN and may then inhibit the ACL when the WTRU returns back to it home PLMN if this was the status of the WTRU in the home PLMN before change of PLMN. Additionally, the WTRU may apply similar behavior for equivalent PLMNs. The WTRU may also be signaled or preconfigured regarding its actions for inhibition or termination during mobility in/out of equivalent PLMNs.

In another example embodiment, the WTRU may signal whether or not the ACL is inhibited. For example, the WTRU may signal the status of ACL inhibition upon a change of service area, such as TA, RA, LA, or the like; a change of MME/SGSN/MSC, a change of PLMN, and/or or any change of the scope of inhibition as described herein.

In another embodiment, the network may also signal the scope of the inhibition to the WTRU. For example, as described above, the network may use a timer-based scope to indicate that the inhibition is for a specific duration of time after which the WTRU may consider the ACL inhibition as terminated. Additionally, the network may perform a security check on the NAS/RRC message that signals the ACL inhibition. When the network determines that the message does not pass the security check, for example of the message has no security protection or fails authentication, the network may ignore the ACL inhibition signal within the message, and/or the message itself.

An indication of OCL or ACL in the subscription CSG may signal inhibition of the ACL. In an example, an ACL inhibit flag may be used to signal the inhibition of the ACL list. The ACL inhibit flag may indicate that the OCL or ACL in the subscription CSG list would allow for the inhibition of the ACL list. In one example embodiment, CSG subscription data IE may include with an extra flag. For example, the following demonstrates an extra 1-bit flag that may be introduced for the CSG-subscription-data IE that may allow the MME/SGSN to make a difference between an OCL CSG Id and an ACL CSG Id:

---
CSG-Subscription-Data ::= <AVP header: 1436 10415>
 { CSG-ID }
 [ Expiration-Date ]
 [OCL/ACL bit]
---

The access-restriction-data or operator-determined-barring element may also be used as an inhibit flag by expanding one or both elements with a new element "ACL Inhibit" that may be used to signal that the ACL should be inhibited. Additionally, a new IE may be created for the ACL inhibition command.

When the Home Subscriber Server (HSS) or the Home Location Register (HLR) receives an update for ACL inhibition for a specific WTRU, it may update its profile in the MME/SGSN by simply sending the ACL Inhibit element with the "ACH Inhibit" bit set. Upon receiving the update, the MME may know how to make a difference in any ACL related operations such as accessing the ACL, adding a CSG in the ACL, deleting a CSG in ACL, or the like. The ACL Inhibit flag may also be interpreted as a command to delete the ACL related records. For example, upon receiving such command, the MME may remove the ACL tagged CSG IDs.

In another example embodiment, a split CSG list may signal inhibition of the ACL List. The CSG subscription data may be split into two separate list as shown below:

---
OCL
 { CSG-Id }
 [ Expiration-Date ]
ACL
 { CSG-Id }
 [ Expiration-Date ]
---

This may allow the subscription data for CSGs to be split. Additionally, the OCL and ACL lists may have a maximum number of elements defined. The split lists may then be applied using the access inhibition flags previously described. The ACL Inhibit flag may be interpreted as a command to delete the ACL related records. For example, upon receiving such command, the MME may remove the ACL tagged CSG IDs and may keep only the OCL with the access.

The signaling and scope of ACL inhibition may be used with any combination of inhibition implementation described herein. For example, the network may indicate if the ACL is inhibited for all RATs or for a specific RAT. In situations where a group of users, such as users with a common subscription profile, are to be provided with signaling for ACL inhibition (or its termination), such information/signaling may be sent to the selected group.

At 330 of FIG. 3, the inhibition of the ACL may be implemented. In one example embodiment, the UE may consider the ACL as non-existing and/or invalid. The WTRU may determine whether the OCL exists. When the OCL exists, the WTRU may consider the OCL as the only list available and may not consider any entries in the ACL as valid entries until it is informed that the ACL inhibition is terminated. When the ACL inhibition is terminated, the WTRU may consider the entries in the ACL as valid entries, may remove all the CSG IDs in the ACL after the inhibition is terminated, and/or may build a new ACL. Additionally, the WTRU may be informed whether the entries in the ACL may be treated as valid entries after the ACL inhibition is terminated.

In another embodiment, the WTRU may consider the ACL as a read-only list. The WTRU may use the CSG ID in the ACL but may not modify the ACL. When access to a CSG cell with an ID in the inhibited ACL is rejected, the WTRU may save the CSG ID of this cell such that automatic cell reselection does not reconsider the CSG ID as access was already rejected.

In another example embodiment, the WTRU may remove all the CSG IDs in the ACL and may consider the ACL as non-existing. Additionally, the WTRU may not modify the ACL until the inhibition is terminated.

In another example embodiment, as described herein, the WTRU cannot modify the ACL and may consider a selected/signaled CSG ID in the ACL invalid for access. The WTRU may remove these CSG IDs from the list that is displayed to the user to avoid access attempt/NAS signaling, such as TAD/RAD/LAD requests, on such CSG cells. The WTRU may also use the selected/signaled CSG IDs as read only and may access the CSG cells associated with the CSG IDs.

In another example embodiment, the WTRU may interpret the ACL inhibition as applicable to individual and/or groups of CSG IDs that are in the ACL. The WTRU may treat the ACL as a read-only list and may not modify the list. For example, this may be done where a group of CSG IDs are categorized on their CSG ID being as part of a reserved ID, or when the same H(e)NB name is broadcast by all these CSGs.

At 340 of FIG. 3, the inhibition of ACL may be interpreted. The inhibition of ACL may be interpreted as having an impact on CSG display. For example, CSG IDs may be within the CSG display may be in the inhibited ACL. In one example embodiment, the WTRU may ignore the inhibited ACL and may display any CSG IDs even if it may be in the inhibited ACL. In another example embodiment, the DE may choose not to display a CSG ID that is inhibited, or the WTRU may display the CSG ID along with an indication that the CSG ID is inhibited. In another example embodiment, the WTRU may also choose to display any CSG ID contained within the inhibited ACL.

The WTRU may also update what is displayed to the user depending on the outcome of the registration or sending of any NAS message. For example, the WTRU may indicate the success or failure of registration for a specific CSG ID that is displayed. The WTRU may also stop displaying a CSG ID for which a registration was not successful. Additionally, the WTRU may still display the ID such that the user may see the ID but cannot select it.

The inhibition of ACL may be interpreted as having an impact on idle mode mobility. For example, automatic CSG cell selection, manual CSG cell selection, manual CSG-cell re-selection, or the like may be affected when the ACL is inhibited. In one example embodiment, when a CSG ID is manually selected, the WTRU may not register or send NAS messages, such as TAD/RAD/LAD requests, to the network. In another example embodiment, when an ID is manually selected, the WTRU may register the network if registration has not already occurred. When the registration is successful, the WTRU may not modify its ACL or may not consider its ACL inhibition to have terminated unless the WTRU is explicitly informed via an IE in the registration response message. In another example embodiment, the WTRU may consider the inhibition of the ACL as terminated if registration from a CSG cell with an ID that is in an inhibited ACL.

In another embodiment, when the user selects a CSG ID that belongs in the inhibited ACL, the WTRU may register such that the ACL is read-only. For example, the inhibited part of the ACL is considered valid but cannot be modified by the user. Additionally, the DE may register when the selected CSG ID is not in the ACL or is not part of the selected CSG IDs for inhibition/invalidation. The WTRU may also consider the CSG IDs in the inhibited ACL for automatic cell selection or re-selection.

In another embodiment, the WTRU may modify its fingerprint in order to ignore or remove the information related to CSG IDs that are in an inhibited ACL. The WTRU may re-consider this information again when the ACL inhibition is terminated.

When inhibition occurs or is signaled in idle mode, the WTRU may reselect an allowed cell, which may be another CSG cell, such as with an ID in the OCL, or a macro or hybrid cell. The WTRU may also reselect if it leaves the connected mode in which it received the signaling for inhibition.

The inhibition of ACL may be interpreted as having an impact on connected mode mobility. For example, the inhibited ACL may affect the automatic CSG selection, or mobility in/out of a CSG with an ID in an inhibited ACL. In an example, the WTRU may consider the CSG ID for connected mode mobility such that the fingerprint in the WTRU may take into account the CSG IDs that may be in the inhibited ACL. The WTRU may also inform the network whether or not a proximity indication may be related to a CSG ID in the inhibited ACL. The network may de-prioritize such a CSG ID in order to avoid possible delays that may be due to a membership check and consequent rejection.

In another embodiment, the WTRU may send a radio resource control (RRC) message, such as a proximity indication, when inhibition occurs or is signaled while the WTRU is in connected mode. This may be done to trigger a handover or inform the RAN about the inhibition of the ACL. The RAN/eNB/network may decide to perform a handover to another cell. For example, the eNB perform a handover to a macro cell, allowed CSG, hybrid cell, or the like.

The NAS may inform the access stratum/RRC about the inhibition of the ACL so that certain actions as explained above may be started with regard to fingerprint information. Similarly, the NAS may inform the stratum/RRC about the termination of the inhibition. If such indication is broadcasted, the RRC may inform the NAS about inhibition and/or its termination. The NAS may then take specific actions, e.g., change its display options or provide an indication to the user about the termination of the inhibition.

Figure 4:
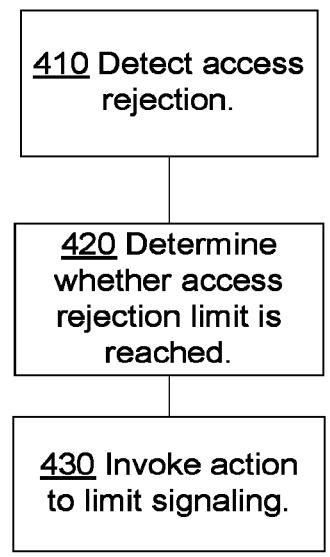
FIG. 4 illustrates a flow chart of an example method for limiting signaling due to continuous manual CSG selection according to embodiments of the present disclosure.

FIG. 4 illustrates a flow chart of an example method for limiting signaling due to continuous manual CSG selection according to embodiments of the present disclosure. This may be done to, for example, prevent a malicious user or group of users from attacking a network by overloading the network with unnecessary signaling.

At 410 of FIG. 4, access rejections may be detected. In an embodiment, the number of registrations (TAU/RAU/LAU) sent by the WTRU may be limited due numerous access rejections by the network. Access rejections may be detected per individual CSG ID, per different trials on different CSG cells, or the like.

At 420 of FIG. 4, it may be determined whether a rejection limit has been reached. The maximum number of rejections may be either signaled to the WTRU or preconfigured. As access rejections are detected, the sum of those rejections may be compared against the maximum number of rejections. When this number is reached, the WTRU may no longer send signaling messages even when the user selects the CSG ID. Additionally, the WTRU may stop displaying the CSG ID or set of IDs that triggered the registration attempts from the WTRU. Moreover, the maximum number of attempts may be associated with a timer such that a maximum number N of attempts may not be surpassed within a specific range of time.

At 430 of FIG. 4, an action may be invoked to limit signaling. For example, the network may inform the WTRU to take specific actions such as to not display or to prevent registration when a CSG cell is selected. The WTRU may be informed in a reject messages sent to the WTRU such as a TAU Reject, a RAU Reject, a LAU Reject, a Attach Reject, or the like. Additionally, the WTRU may be informed via an IE that specifies the actions to be taken by the UE, an OMA DM, an OTA, or the like. The UE may resume its display for the CSG ID(s) or for sending registration messages when other triggers occur such as when a timer expires, when the WTRU moves to a macro cell or another allowed CSG, when the CSG ID is already in a list within the WTRU, or the like. Additionally, the WTRU may resume its display for the CSG ID(s) when the WTRU moves to a different RAT or PLMN, or when the when the UE receives explicit signaling to lift any restrictions.

Example Operating Environment and Devices

Figure 5:
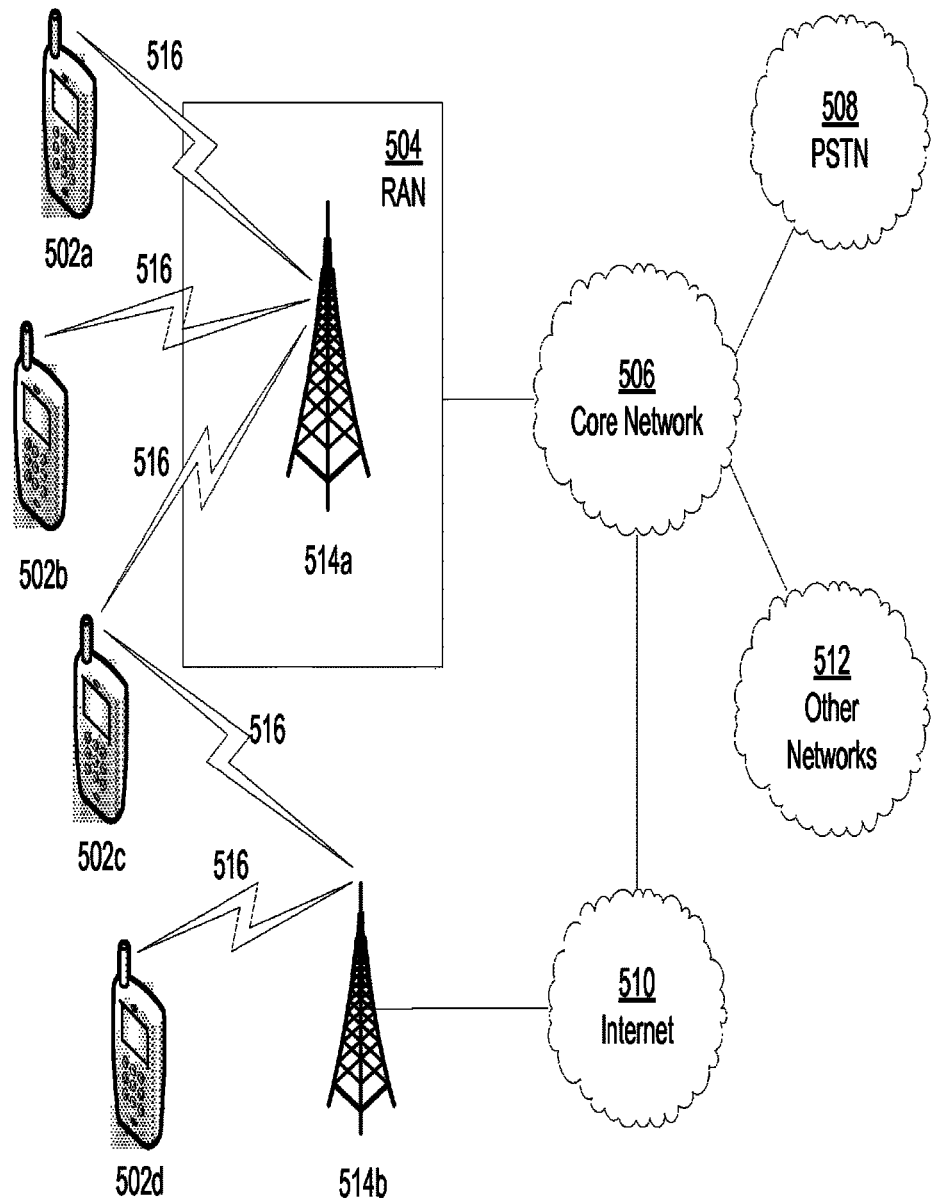
FIG. 5 is a system diagram of an example communications system in which one or more disclosed embodiments may be implemented.

FIG. 5 is a diagram of an example communications system 500 in which one or more disclosed embodiments may be implemented. The communications system 500 may be a multiple access system that provides content, such as voice, data, video, messaging, broadcast, etc., to multiple wireless users. The communications system 500 may enable multiple wireless users to access such content through the sharing of system resources, including wireless bandwidth. For example, the communications systems 500 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 5, the communications system 500 may include wireless transmit/receive units (WTRUs) 502a, 502b, 502c, 502d, a radio access network (RAN) 504, a core network 506, a public switched telephone network (PSTN) 508, the Internet 510, and other networks 512, though it will be appreciated that the disclosed embodiments contemplate any number of WTRUs, base stations, networks, and/or network elements. Each of the WTRUs 502a, 502b, 502c, 502d may be any type of device configured to operate and/or communicate in a wireless environment. By way of example, the WTRUs 502a, 502b, 502c, 502d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 500 may also include a base station 514a and a base station 514b. Each of the base stations 514a, 514b may be any type of device configured to wirelessly interface with at least one of the WTRUs 502a, 502b, 502c, 502d to facilitate access to one or more communication networks, such as the core network 506, the Internet 510, and/or the networks 512. By way of example, the base stations 514a, 514b may be a base transceiver station (BTS), a Node-B, an eNode B, a Home Node B, a Home eNode B, a site controller, an access point (AP), a wireless router, and the like. While the base stations 514a, 514b are each depicted as a single element, it will be appreciated that the base stations 514a, 514b may include any number of interconnected base stations and/or network elements.

The base station 514a may be part of the RAN 504, which may also include other base stations and/or network elements (not shown), such as a base station controller (BSC), a radio network controller (RNC), relay nodes, etc. The base station 514a and/or the base station 514b may be configured to transmit and/or receive wireless signals within a particular geographic region, which may be referred to as a cell (not shown). The cell may further be divided into cell sectors. For example, the cell associated with the base station 514a may be divided into three sectors. Thus, in one embodiment, the base station 514a may include three transceivers, i.e., one for each sector of the cell. In another embodiment, the base station 514a may employ multiple-input multiple output (MIMO) technology and, therefore, may utilize multiple transceivers for each sector of the cell.

The base stations 514a, 514b may communicate with one or more of the WTRUs 502a, 502b, 502c, 502d over an air interface 516, which may be any suitable wireless communication link (e.g., radio frequency (RF), microwave, infrared (IR), ultraviolet (UV), visible light, etc.). The air interface 516 may be established using any suitable radio access technology (RAT).

More specifically, as noted above, the communications system 500 may be a multiple access system and may employ one or more channel access schemes, such as CDMA, TDMA, FDMA, OFDMA, SC-FDMA, and the like. For example, the base station 514a in the RAN 504 and the WTRUs 502a, 502b, 502c may implement a radio technology such as Universal Mobile Telecommunications System (UMTS) Terrestrial Radio Access (UTRA), which may establish the air interface 516 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 514a and the WTRUs 502a, 502b, 502c may implement a radio technology such as Evolved UMTS Terrestrial Radio Access (E-UTRA), which may establish the air interface 516 using Long Term Evolution (LTE) and/or LTE-Advanced (LTE-A).

In other embodiments, the base station 514a and the WTRUs 502a, 502b, 502c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 514b in FIG. 5 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 514b and the WTRUs 502c, 502d may implement a radio technology such as IEEE 802.11 to establish a wireless local area network (WLAN). In another embodiment, the base station 514b and the WTRUs 502c, 502d may implement a radio technology such as IEEE 802.15 to establish a wireless personal area network (WPAN). In yet another embodiment, the base station 514b and the WTRUs 502c, 502d may utilize a cellular-based RAT (e.g., WCDMA, CDMA2000, GSM, LTE, LTE-A, etc.) to establish a picocell or femtocell. As shown in FIG. 5, the base station 514b may have a direct connection to the Internet 510. Thus, the base station 514b may not be required to access the Internet 510 via the core network 106.

The RAN 504 may be in communication with the core network 506, which may be any type of network configured to provide voice, data, applications, and/or voice over internet protocol (VoIP) services to one or more of the WTRUs 502a, 502b, 502c, 502d. For example, the core network 506 may provide call control, billing services, mobile location-based services, pre-paid calling, Internet connectivity, video distribution, etc., and/or perform high-level security functions, such as user authentication. Although not shown in FIG. 5, it will be appreciated that the RAN 504 and/or the core network 506 may be in direct or indirect communication with other RANs that employ the same RAT as the RAN 504 or a different RAT. For example, in addition to being connected to the RAN 504, which may be utilizing an E-UTRA radio technology, the core network 506 may also be in communication with another RAN (not shown) employing a GSM radio technology.

The core network 506 may also serve as a gateway for the WTRUs 502a, 502b, 502c, 502d to access the PSTN 508, the Internet 510, and/or other networks 512. The PSTN 508 may include circuit-switched telephone networks that provide plain old telephone service (POTS). The Internet 510 may include a global system of interconnected computer networks and devices that use common communication protocols, such as the transmission control protocol (TCP), user datagram protocol (UDP) and the internet protocol (IP) in the TCP/IP internet protocol suite. The networks 512 may include wired or wireless communications networks owned and/or operated by other service providers. For example, the networks 512 may include another core network connected to one or more RANs, which may employ the same RAT as the RAN 504 or a different RAT.

Some or all of the WTRUs 502a, 502b, 502c, 502d in the communications system 500 may include multi-mode capabilities, i.e., the WTRUs 502a, 502b, 502c, 502d may include multiple transceivers for communicating with different wireless networks over different wireless links. For example, the WTRU 502c shown in FIG. 5 may be configured to communicate with the base station 514a, which may employ a cellular-based radio technology, and with the base station 514b, which may employ an IEEE 802 radio technology.

Figure 6:
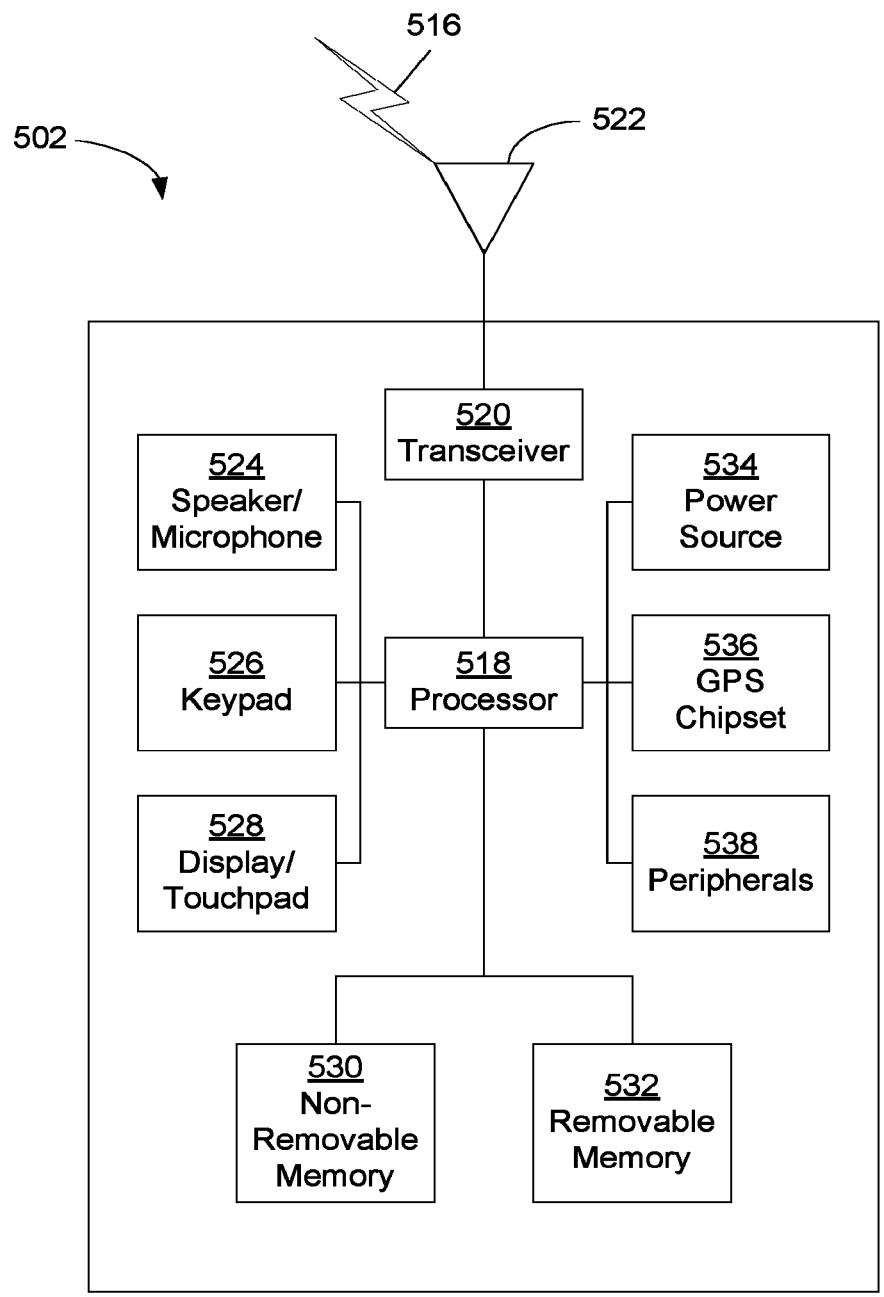
FIG. 6 is a system diagram of an example wireless transmit/receive unit (WTRU) that may be used within the communications system illustrated in FIG. 5.

FIG. 6 is a system diagram of an example WTRU 502. As shown in FIG. 6, the WTRU 502 may include a processor 518, a transceiver 520, a transmit/receive element 522, a speaker/microphone 524, a keypad 526, a display/touchpad 528, non-removable memory 506, removable memory 532, a power source 534, a global positioning system (GPS) chipset 536, and other peripherals 538. It will be appreciated that the WTRU 502 may include any sub-combination of the foregoing elements while remaining consistent with an embodiment.

The processor 518 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 518 may perform signal coding, data processing, power control, input/output processing, and/or any other functionality that enables the WTRU 502 to operate in a wireless environment. The processor 518 may be coupled to the transceiver 520, which may be coupled to the transmit/receive element 522. While FIG. 6 depicts the processor 518 and the transceiver 520 as separate components, it will be appreciated that the processor 518 and the transceiver 520 may be integrated together in an electronic package or chip.

The transmit/receive element 522 may be configured to transmit signals to, or receive signals from, a base station (e.g., the base station 514a) over the air interface 516. For example, in one embodiment, the transmit/receive element 522 may be an antenna configured to transmit and/or receive RF signals. In another embodiment, the transmit/receive element 522 may be an emitter/detector configured to transmit and/or receive IR, UV, or visible light signals, for example. In yet another embodiment, the transmit/receive element 522 may be configured to transmit and receive both RF and light signals. It will be appreciated that the transmit/receive element 522 may be configured to transmit and/or receive any combination of wireless signals.

In addition, although the transmit/receive element 522 is depicted in FIG. 6 as a single element, the WTRU 502 may include any number of transmit/receive elements 522. More specifically, the WTRU 502 may employ MIMO technology. Thus, in one embodiment, the WTRU 502 may include two or more transmit/receive elements 522 (e.g., multiple antennas) for transmitting and receiving wireless signals over the air interface 516.

The transceiver 520 may be configured to modulate the signals that are to be transmitted by the transmit/receive element 522 and to demodulate the signals that are received by the transmit/receive element 522. As noted above, the WTRU 502 may have multi-mode capabilities. Thus, the transceiver 520 may include multiple transceivers for enabling the WTRU 502 to communicate via multiple RATs, such as UTRA and IEEE 802.11, for example.

The processor 518 of the WTRU 502 may be coupled to, and may receive user input data from, the speaker/microphone 524, the keypad 526, and/or the display/touchpad 528 (e.g., a liquid crystal display (LCD) display unit or organic light-emitting diode (OLED) display unit). The processor 518 may also output user data to the speaker/microphone 524, the keypad 526, and/or the display/touchpad 528. In addition, the processor 518 may access information from, and store data in, any type of suitable memory, such as the non-removable memory 506 and/or the removable memory 532. The non-removable memory 506 may include random-access memory (RAM), read-only memory (ROM), a hard disk, or any other type of memory storage device. The removable memory 532 may include a subscriber identity module (SIM) card, a memory stick, a secure digital (SD) memory card, and the like. In other embodiments, the processor 518 may access information from, and store data in, memory that is not physically located on the WTRU 502, such as on a server or a home computer (not shown).

The processor 518 may receive power from the power source 534, and may be configured to distribute and/or control the power to the other components in the WTRU 502. The power source 534 may be any suitable device for powering the WTRU 502. For example, the power source 534 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 518 may also be coupled to the GPS chipset 536, which may be configured to provide location information (e.g., longitude and latitude) regarding the current location of the WTRU 502. In addition to, or in lieu of, the information from the GPS chipset 536, the WTRU 502 may receive location information over the air interface 516 from a base station (e.g., base stations 514*a*, 514*b*) and/or determine its location based on the timing of the signals being received from two or more nearby base stations. It will be appreciated that the WTRU 502 may acquire location information by way of any suitable location-determination method while remaining consistent with an embodiment.

The processor 518 may further be coupled to other peripherals 538, which may include one or more software and/or hardware modules that provide additional features, functionality and/or wired or wireless connectivity. For example, the peripherals 538 may include an accelerometer, an e-compass, a satellite transceiver, a digital camera (for photographs or video), a universal serial bus (USB) port, a vibration device, a television transceiver, a hands free headset, a BLUETOOTH® module, a frequency modulated (FM) radio unit, a digital music player, a media player, a video game player module, an Internet browser, and the like.

Figure 7:
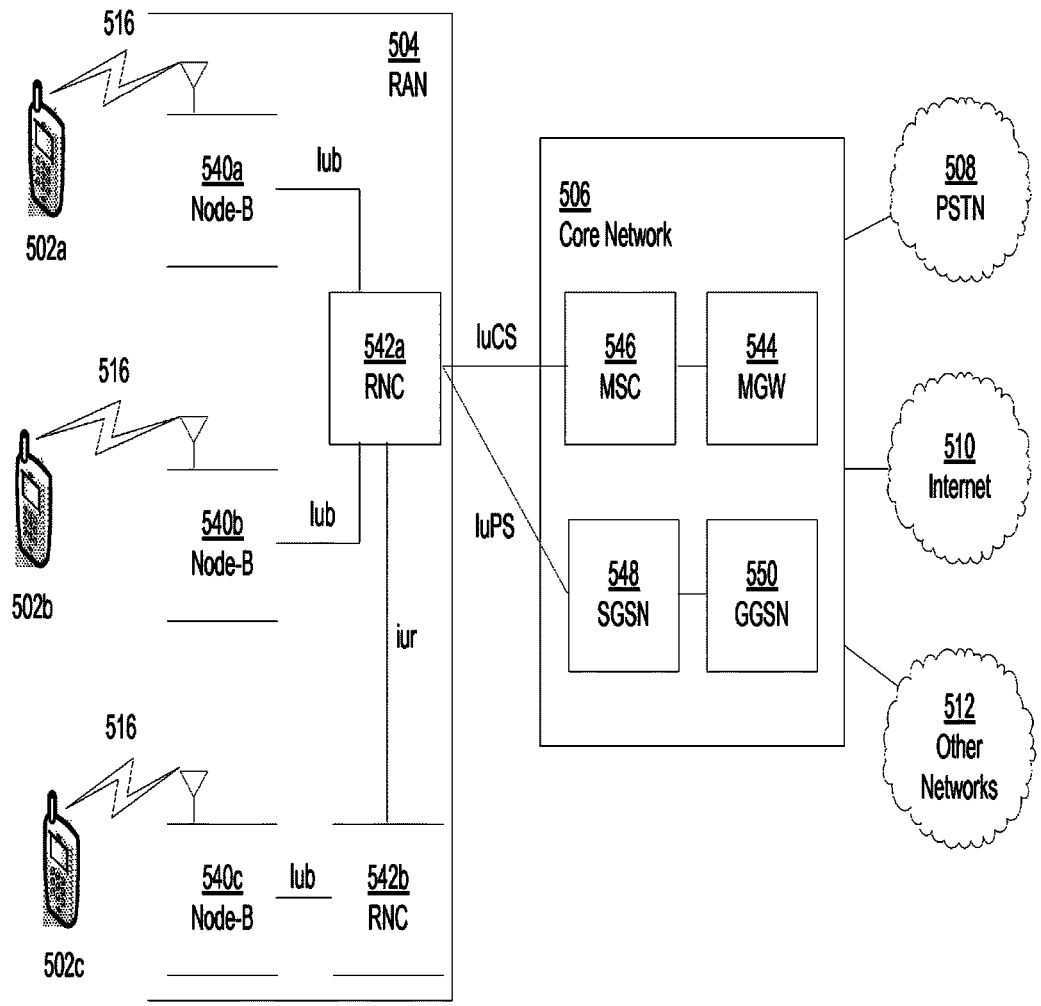
FIG. 7 is a system diagram of an example radio access network and an example core network that may be used within the communications system illustrated in FIG. 5.

FIG. 7 is a system diagram of the RAN 504 and the core network 506 according to an embodiment. As noted above, the RAN 504 may employ a UTRA radio technology to communicate with the WTRUs 502*a*, 502*b*, 502*c* over the air interface 516. The RAN 504 may also be in communication with the core network 506. As shown in FIG. 7, the RAN 504 may include Node-Bs 540*a*, 540*b*, 540*c*, which may each include one or more transceivers for communicating with the WTRUs 502*a*, 502*b*, 502*c* over the air interface 516. The Node-Bs 540*a*, 540*b*, 540*c* may each be associated with a particular cell (not shown) within the RAN 504. The RAN 504 may also include RNCs 542*a*, 542*b*. It will be appreciated that the RAN 504 may include any number of Node-Bs and RNCs while remaining consistent with an embodiment.

As shown in FIG. 7, the Node-Bs 540*a*, 540*b* may be in communication with the RNC 542*a*. Additionally, the Node-B 540*c* may be in communication with the RNC 542*b*. The Node-Bs 540*a*, 540*b*, 540*c* may communicate with the respective RNCs 542*a*, 542*b* via an Iub interface. The RNCs 542*a*, 542*b* may be in communication with one another via an Iur interface. Each of the RNCs 542*a*, 542*b* may be configured to control the respective Node-Bs 540*a*, 540*b*, 540*c* to which it is connected. In addition, each of the RNCs 542*a*, 542*b* may be configured to carry out or support other functionality, such as outer loop power control, load control, admission control, packet scheduling, handover control, macrodiversity, security functions, data encryption, and the like.

The core network 506 shown in FIG. 11 may include a media gateway (MGW) 544, a mobile switching center (MSC) 546, a serving GPRS support node (SGSN) 548, and/or a gateway GPRS support node (GGSN) 550. While each of the foregoing elements are depicted as part of the core network 506, it will be appreciated that any one of these elements may be owned and/or operated by an entity other than the core network operator.

The RNC 542*a* in the RAN 504 may be connected to the MSC 546 in the core network 506 via an IuCS interface. The MSC 546 may be connected to the MGW 544. The MSC 546 and the MGW 544 may provide the WTRUs 502*a*, 502*b*, 502*c* with access to circuit-switched networks, such as the PSTN 508, to facilitate communications between the WTRUs 502*a*, 502*b*, 502*c* and traditional land-line communications devices.

The RNC 542*a* in the RAN 504 may also be connected to the SGSN 548 in the core network 506 via an IuPS interface. The SGSN 548 may be connected to the GGSN 550. The SGSN 548 and the GGSN 550 may provide the WTRUs 502*a*, 502*b*, 502*c* with access to packet-switched networks, such as the Internet 510, to facilitate communications between and the WTRUs 502*a*, 502*b*, 502*c* and IP-enabled devices.

As noted above, the core network 506 may also be connected to the networks 512, which may include other wired or wireless networks that are owned and/or operated by other service providers.

Figure 8:
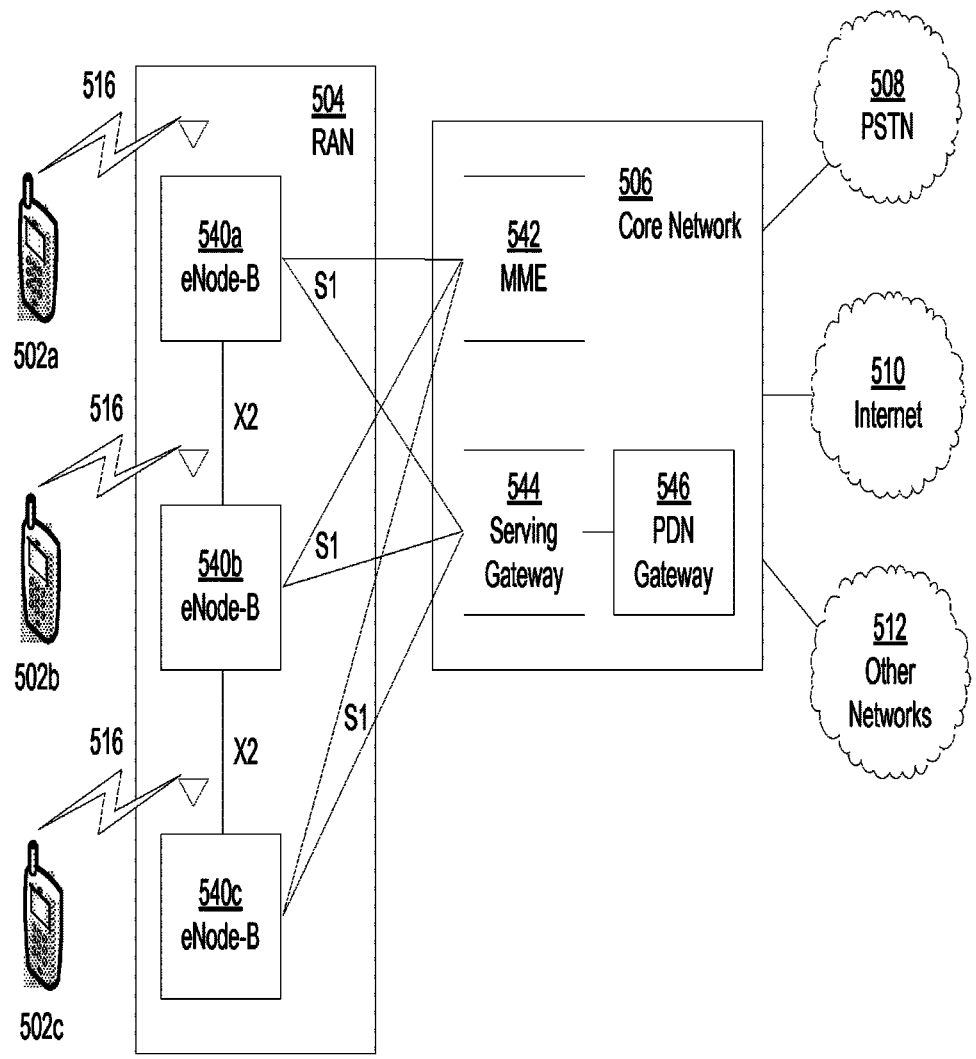
FIG. 8 is a system diagram of another example radio access network and an example core network that may be used within the communications system illustrated in FIG. 5.

FIG. 8 is a system diagram of the RAN 504 and the core network 906 according to an embodiment. As noted above, the RAN 504 may employ an E-UTRA radio technology to communicate with the WTRUs 502*a*, 502*b*, 502*c* over the air interface 516. The RAN 504 may also be in communication with the core network 506.

The RAN 504 may include eNode-Bs 540*a*, 540*b*, 540*c*, though it will be appreciated that the RAN 504 may include any number of eNode-Bs while remaining consistent with an embodiment. The eNode-Bs 540*a*, 540*b*, 540*c* may each include one or more transceivers for communicating with the WTRUs 502*a*, 502*b*, 502*c* over the air interface 516. In one embodiment, the eNode-Bs 540*a*, 540*b*, 540*c* may implement MIMO technology. Thus, the eNode-B 540*a*, for example, may use multiple antennas to transmit wireless signals to, and receive wireless signals from, the WTRU 502*a*.

Each of the eNode-Bs 540*a*, 540*b*, 540*c* may be associated with a particular cell (not shown) and may be configured to handle radio resource management decisions, handover decisions, scheduling of users in the uplink and/or downlink, and the like. As shown in FIG. 8, the eNode-Bs 540*a*, 540*b*, 540*c* may communicate with one another over an X2 interface.

The core network 506 shown in FIG. 8 may include a mobility management gateway (MME) 542, a serving gateway 544, and a packet data network (PDN) gateway 546. While each of the foregoing elements are depicted as part of the core network 506, it will be appreciated that any one of these elements may be owned and/or operated by an entity other than the core network operator.

The MME 542 may be connected to each of the eNode-Bs 542*a*, 542*b*, 542*c* in the RAN 504 via an S1 interface and may serve as a control node. For example, the MME 542 may be responsible for authenticating users of the WTRUs 502*a*, 502*b*, 502*c*, bearer activation/deactivation, selecting a particular serving gateway during an initial attach of the WTRUs 502*a*, 502*b*, 502*c*, and the like. The MME 542 may also provide a control plane function for switching between the RAN 504 and other RANs (not shown) that employ other radio technologies, such as GSM or WCDMA.

The serving gateway 544 may be connected to each of the eNode Bs 540*a*, 540*b*, 540*c* in the RAN 504 via the S1 interface. The serving gateway 544 may generally route and forward user data packets to/from the WTRUs 502*a*, 502*b*, 502*c*. The serving gateway 544 may also perform other functions, such as anchoring user planes during inter-eNode B handovers, triggering paging when downlink data is available for the WTRUs 502*a*, 502*b*, 502*c*, managing and storing contexts of the WTRUs 502*a*, 502*b*, 502*c*, and the like.

The serving gateway 544 may also be connected to the PDN gateway 546, which may provide the WTRUs 502*a*, 502*b*, 502*c* with access to packet-switched networks, such as the Internet 510, to facilitate communications between the WTRUs 502*a*, 502*b*, 502*c* and IP-enabled devices.

The core network 506 may facilitate communications with other networks. For example, the core network 506 may provide the WTRUs 502*a*, 502*b*, 502*c* with access to circuit-switched networks, such as the PSTN 508, to facilitate communications between the WTRUs 502a, 502b, 502c and traditional land-line communications devices. For example, the core network 506 may include, or may communicate with, an IP gateway (e.g., an IP multimedia subsystem (IMS) server) that serves as an interface between the core network 506 and the PSTN 508. In addition, the core network 506 may provide the WTRUs 502a, 502b, 502c with access to the networks 512, which may include other wired or wireless networks that are owned and/or operated by other service providers.

Figure 9:
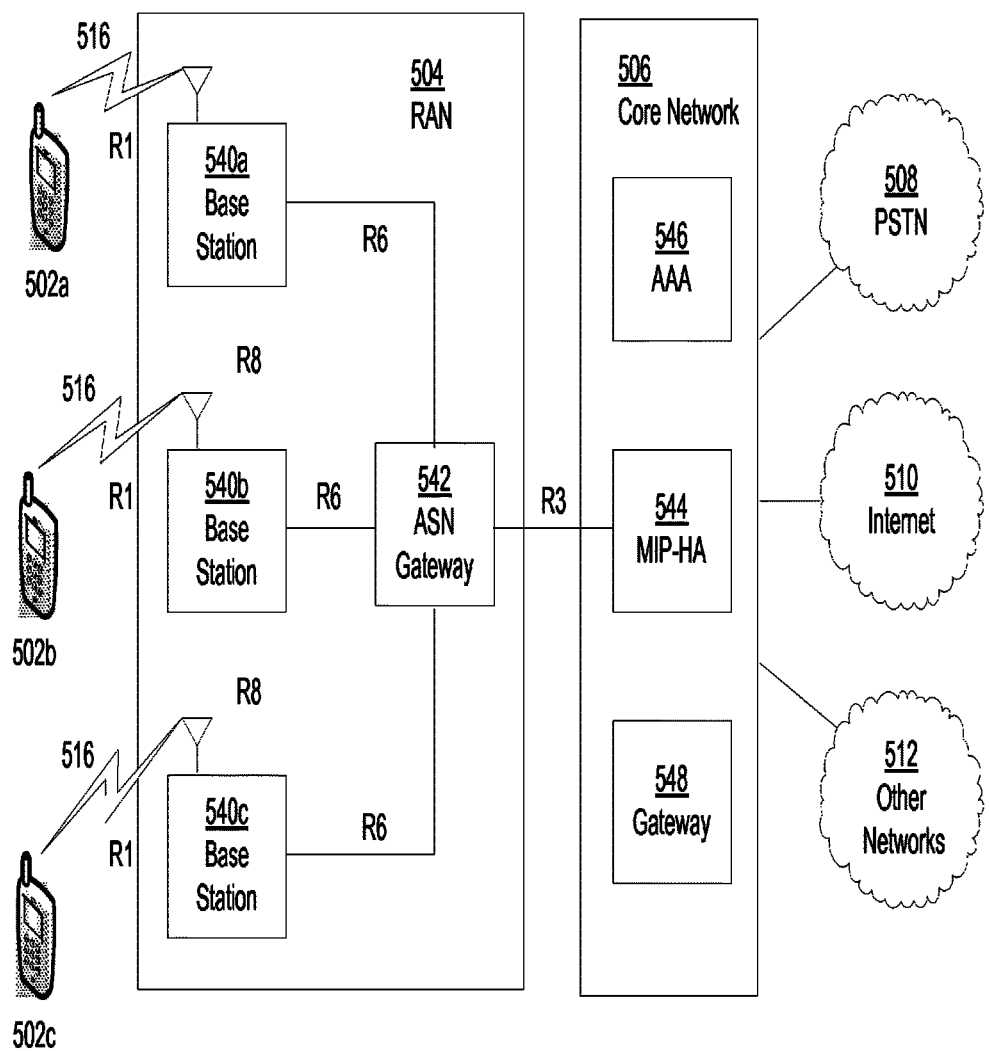
FIG. 9 is a system diagram of another example radio access network and an example core network that may be used within the communications system illustrated in FIG. 5.

FIG. 9 is a system diagram of the RAN 504 and the core network 506 according to an embodiment. The RAN 504 may be an access service network (ASN) that employs IEEE 802.16 radio technology to communicate with the WTRUs 502a, 502b, 502c over the air interface 516. As will be further discussed below, the communication links between the different functional entities of the WTRUs 502a, 502b, 502c, the RAN 504, and the core network 506 may be defined as reference points.

As shown in FIG. 9, the RAN 504 may include base stations 540a, 540b, 540c, and an ASN gateway 542, though it will be appreciated that the RAN 504 may include any number of base stations and ASN gateways while remaining consistent with an embodiment. The base stations 540a, 540b, 540c may each be associated with a particular cell (not shown) in the RAN 504 and may each include one or more transceivers for communicating with the WTRUs 502a, 502b, 502c over the air interface 516. In one embodiment, the base stations 540a, 540b, 540c may implement MIMO technology. Thus, the base station 540a, for example, may use multiple antennas to transmit wireless signals to, and receive wireless signals from, the WTRU 502a. The base stations 540a, 540b, 540c may also provide mobility management functions, such as handoff triggering, tunnel establishment, radio resource management, traffic classification, quality of service (QoS) policy enforcement, and the like. The ASN gateway 542 may serve as a traffic aggregation point and may be responsible for paging, caching of subscriber profiles, routing to the core network 506, and the like.

The air interface 516 between the WTRUs 502a, 502b, 502c and the RAN 504 may be defined as an R1 reference point that implements the IEEE 802.16 specification. In addition, each of the WTRUs 502a, 502b, 502c may establish a logical interface (not shown) with the core network 506. The logical interface between the WTRUs 502a, 502b, 502c and the core network 506 may be defined as an R2 reference point, which may be used for authentication, authorization, IP host configuration management, and/or mobility management.

The communication link between each of the base stations 540a, 540b, 540c may be defined as an R8 reference point that includes protocols for facilitating WTRU handovers and the transfer of data between base stations. The communication link between the base stations 540a, 540b, 540c and the ASN gateway 542 may be defined as an R6 reference point. The R6 reference point may include protocols for facilitating mobility management based on mobility events associated with each of the WTRUs 502a, 502b, 500c.

As shown in FIG. 9, the RAN 504 may be connected to the core network 506. The communication link between the RAN 504 and the core network 506 may defined as an R3 reference point that includes protocols for facilitating data transfer and mobility management capabilities, for example. The core network 506 may include a mobile IP home agent (MIP-HA) 544, an authentication, authorization, accounting (AAA) server 546, and a gateway 548. While each of the foregoing elements are depicted as part of the core network 506, it will be appreciated that any one of these elements may be owned and/or operated by an entity other than the core network operator.

The MIP-HA may be responsible for IP address management, and may enable the WTRUs 502a, 502b, 502c to roam between different ASNs and/or different core networks. The MIP-HA 544 may provide the WTRUs 502a, 502b, 502c with access to packet-switched networks, such as the Internet 510, to facilitate communications between the WTRUs 502a, 502b, 502c and IP-enabled devices. The AAA server 546 may be responsible for user authentication and for supporting user services. The gateway 548 may facilitate interworking with other networks. For example, the gateway 548 may provide the WTRUs 502a, 502b, 502c with access to circuit-switched networks, such as the PSTN 508, to facilitate communications between the WTRUs 502a, 502b, 502c and traditional land-line communications devices. In addition, the gateway 548 may provide the WTRUs 502a, 502b, 502c with access to the networks 512, which may include other wired or wireless networks that are owned and/or operated by other service providers.

Although not shown in FIG. 9, it will be appreciated that the RAN 504 may be connected to other ASNs and the core network 506 may be connected to other core networks. The communication link between the RAN 504 the other ASNs may be defined as an R4 reference point, which may include protocols for coordinating the mobility of the WTRUs 502a, 502b, 502c between the RAN 504 and the other ASNs. The communication link between the core network 506 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU), the WTRU having a manual mode, the method comprising:

receiving, via at least one of an Open Mobile Alliance Device Management (OMA DM) or a subscriber identity module over-the-air (SIM OTA) communications connection, a configuration corresponding to a public land mobile network (PLMN), the configuration causing the WTRU in the manual mode to perform at least:

displaying one or more available closed subscriber group (CSG) identification (ID) in an operator CSG list (OCL) for the PLMN; and restricting from display one or more available CSG IDs of an allowed CSG list (ACL) for the PLMN, the restricted one or more CSG IDs of the ACL being available in the ACL.

2. The method of claim 1, further comprising:
receiving, from the at least one of an Open Mobile Alliance Device Management (OMA DM) or a subscriber identity module over-the-air (SIM OTA) communications connection, a message that enables the WTRU to control inhibition of an allowed closed subscriber group list (ACL), wherein the message enables the WTRU to prevent user selection of a closed subscriber group (CSG) cell in the ACL.

3. The method of claim 2, wherein the controlling inhibition includes preventing, in response to receiving the message, selection of the CSG cell in the ACL.

4. The method of claim 2, wherein the message indicates a time duration for the inhibition of the ACL.

5. The method of claim 4, further comprising:
controlling inhibition of the ACL based on the time duration.

6. The method of claim 1, further comprising:
identifying a PLMN in which the WTRU is operating; and
controlling CSG selection based on the identified PLMN.

7. The method of claim 6, wherein the identifying the PLMN in which the WTRU is operating includes identifying the PLMN as being at least one of a home PLMN (HPLMN) or a visited PLMN (VPLMN).

8. The method of claim 7, wherein the identifying the PLMN in which the WTRU is operating includes determining that the WTRU is within the HPLMN and upon determining that the WTRU is within the HPLMN:
inhibiting an ACL; and
inhibiting user selection of a CSG cell.

9. The method of claim 8, further comprising:
presenting to a user one or more available CSG cells contained in an OCL.

10. The method of claim 9, further comprising:
restricting user selection to the one or more available CSG cells contained in the OCL.

11. A wireless transmit/receive unit (WTRU), the WTRU having a manual mode, the WTRU comprising:
a receiver configured to receive via at least one of an Open Mobile Alliance Device Management (OMA DM) or a subscriber identity module over-the-air (SIM OTA) communications connection, a configuration corresponding to a public land mobile network (PLMN); and
a processor, the processor configured to implement the configuration, the configuration causing the WTRU in the manual mode to at least:
display one or more available closed subscriber group (CSG) identification (ID) in an operator CSG list (OCL) for the PLMN; and
restrict from display one or more available CSG IDs of an allowed CSG list (ACL) for the PLMN, the restricted one or more CSG IDs of the ACL being available in the ACL.

12. The WTRU of claim 11, wherein the receiver is further configured to:
receive from the at least one of an Open Mobile Alliance Device Management (OMA DM) or a subscriber identity module over-the-air (SIM OTA) communications connection, a message that enables the WTRU to control inhibition of an allowed closed subscriber group list (ACL), wherein the processor is further configured such that the message enables the WTRU to prevent user selection of a closed subscriber group (CSG) cell in the ACL.

13. The WTRU of claim 12, wherein the processor is further configured such that the controlling inhibition includes preventing, in response to receiving the message, selection of the CSG cell in the ACL.

14. The WTRU of claim 12, wherein the message indicates a time duration for the inhibition of the ACL.

15. The WTRU of claim 14, wherein the processor is further configured to:
control inhibition of the ACL based on the time duration.

16. The WTRU of claim 11, wherein the processor is further configured to:
identify a PLMN in which the WTRU is operating; and
control CSG selection based on the identified PLMN.

17. The WTRU of claim 16, wherein the processor is further configured such that the identifying the PLMN in which the WTRU is operating includes identifying the PLMN as being at least one of a home PLMN (HPLMN) or a visited PLMN (VPLMN).

18. The WTRU of claim 17, wherein the processor is further configured such that the identifying the PLMN in which the WTRU is operating includes determining that the WTRU is within the HPLMN, and the processor is further configured, upon determining that the WTRU is within the HPLMN, to:
inhibit an ACL; and
inhibit user selection of a CSG cell.

19. The WTRU of claim 18, wherein the processor is further configured to:
present to a user one or more available CSG cells contained in an OCL.

20. The WTRU of claim 19, wherein the processor is further configured to:
restrict user selection to the one or more available CSG cells contained in the OCL.

* * * * *